Figure 1:
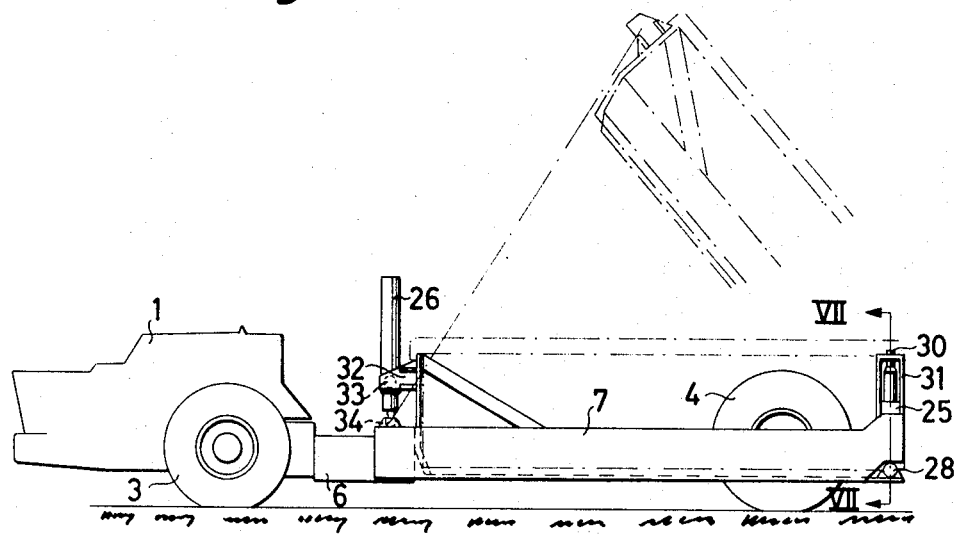

United States Patent

[11] 3,557,982

| [72] | Inventors | Sune Torsten Henriksson<br>Lingonstigen 2;<br>Ake Malmgren, Tvargatan 5; Ragnar<br>Ludvig Muotka, Kyrkogatan 46; Lars<br>Harald Widegren, Lararegatan 14, Kiruna,<br>Sweden |
|---|---|---|
| [21] | Appl. No. | 765,368 |
| [22] | Filed | Oct. 7, 1968 |
| [45] | Patented | Jan. 26, 1971 |

[54] TRANSPORT VEHICLES FOR LOAD-CARRYING PURPOSES
4 Claims, 7 Drawing Figs.

[52] U.S. Cl. .................................................. 214/300, 214/392
[51] Int. Cl. .................................................. B65g 65/02
[50] Field of Search .................................... 214/300, 312, 313, 314, 390, 392, 394, 396; 298/5

[56] References Cited
UNITED STATES PATENTS

| 2,672,247 | 3/1954 | Jewett | 214/392X |
| 3,024,931 | 3/1962 | Grover et al. | (214/390UX) |

*Primary Examiner*—Hugo O. Schulz
*Attorney*—Sommers & Young

ABSTRACT: A transport vehicle for load-carrying purposes and consisting of a power vehicle and a trailer hingedly connected thereto, said trailer having a wheel-supported U-shaped outer stationary frame open to the rear and a U-shaped inner frame open to the rear and supported for vertical movements within said outer frame, said vehicle being distinguished in that a raising and carrying means for the inner frame in the form of a pressure fluid operated power cylinder is mounted at the rear end of each of the limbs of the outer frame as well as centrally at the frontal transverse portion of said outer frame.

PATENTED JAN 26 1971

3,557,982

SHEET 3 OF 3

SUNE T. HENRIKSSON
ÅKE MALMGREN
RAGNAR L. MUOTKA
LARS H. WIDEGREN

BY Sommers & Young

TRANSPORT VEHICLES FOR LOAD-CARRYING PURPOSES

The present invention refers to a transport vehicle for load-carrying purposes and consisting of a power vehicle and a trailer, hingedly connected thereto, said trailer having a wheel-supported U-shaped outer stationary frame open to the rear and a U-shaped inner frame open to the rear and supported for vertical movements within said outer frame, said inner frame being adapted to be brought into position for seizing a load container or other load-supporting member by moving the vehicle, said outer frame being provided with pressure fluid operated devices for raising said inner frame with said load-supporting member into a position for transportation and for bringing said inner frame to make a dumping movement around a tipping center at the rear portion of said trailer for deloading purposes.

The object of the invention is to provide a vehicle of this kind, which is particularly suited for transport of individual containers, pallets and other load-carrying means which standing on the ground or other actual support, on which the vehicle is driven, can be seized by the trailer in loaded condition and raised up to a suitable transport position and then moved to the intended place for unloading and there become emptied by tipping and then returned to desired loading position and left on the ground or the support. After this, the vehicle is ready for seizing a new loaded container or the like. In this manner, one and the same vehicle can be utilized continuously for transport of loads which are made up under the travel of the vehicle to and from the place for unloading, and therefore the time for loading the vehicle will be reduced to a minimum comprising just a lifting operation made by the vehicle itself.

The invention is distinguished by the fact that a raising and carrying means for the inner frame in the form of a pressure fluid operated power cylinder is mounted at the rear end of each of the limbs of the outer frame as well as centrally at the frontal transverse portion of said outer frame.

Figure 2:
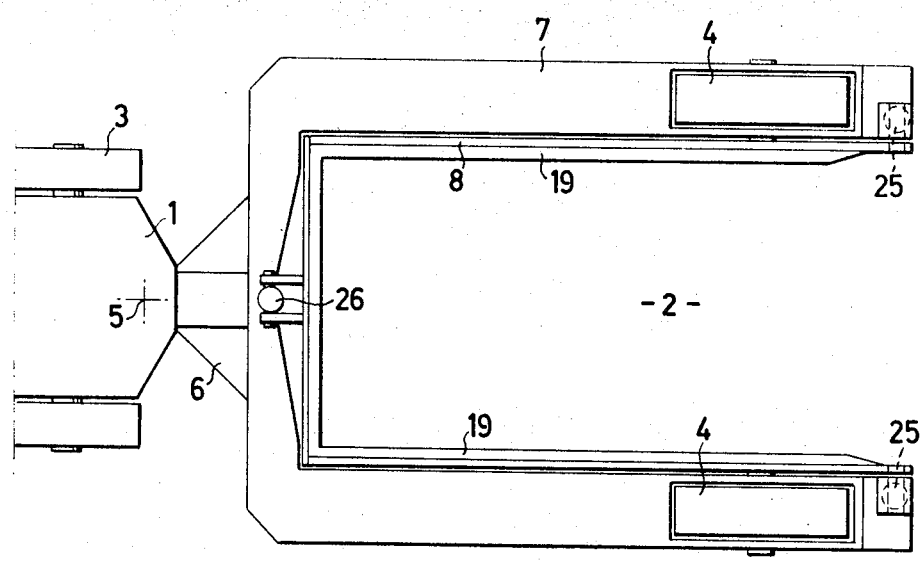
Figure 3:
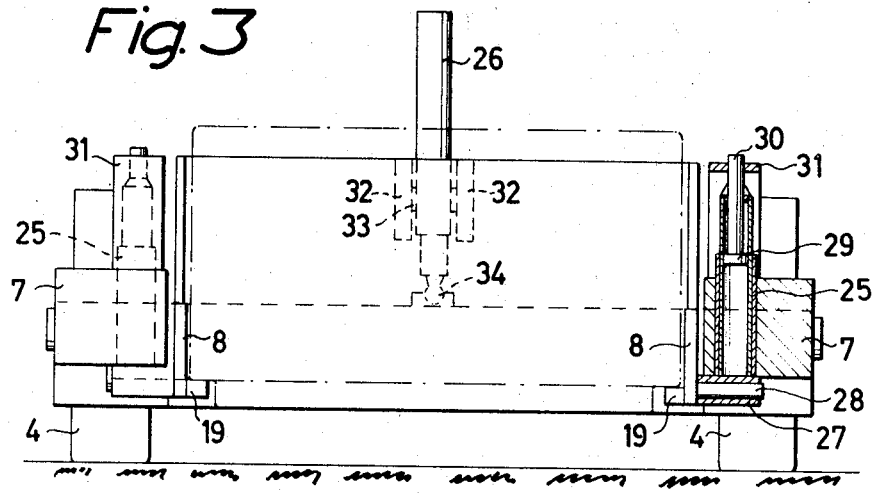
Figure 4:
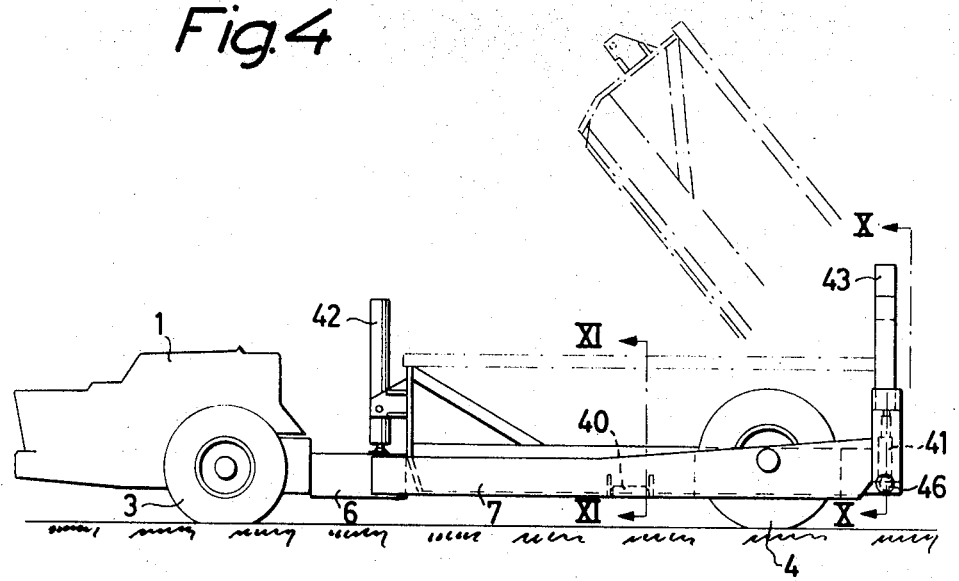
Figure 5:
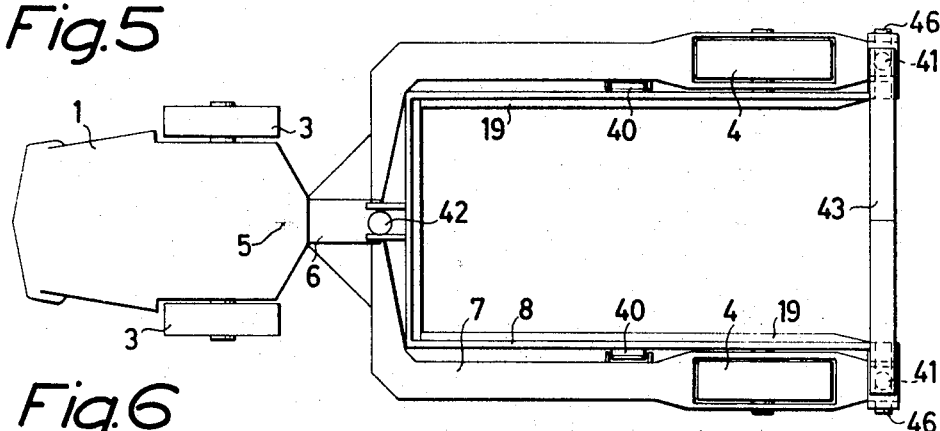
Figure 6:
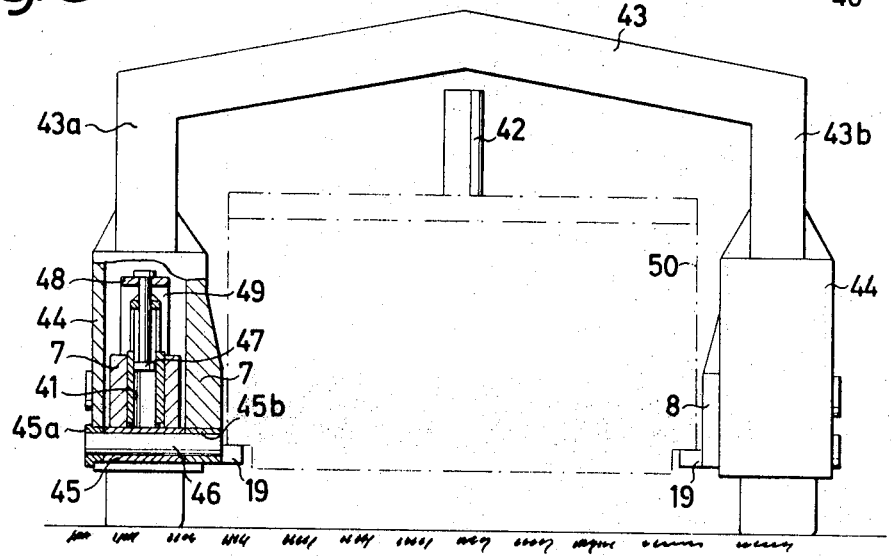
Figure 7:
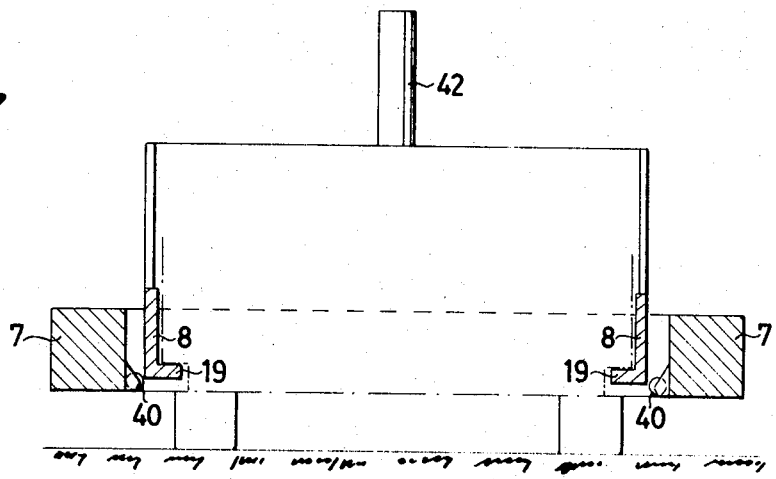

The above-stated and other objects of the invention will be evident from the following description as read in connection with the accompanying drawings, which illustrate some preferred embodiments of the invention and on which FIG. 1 illustrates a diagrammatical elevation of a vehicle according to a first embodiment of the invention. FIG. 2 illustrates a substantially diagrammatical plan view of said embodiment and FIG. 3 illustrates the trailer of said embodiment as seen from the rear and partly in section along line VII–VII in FIG. 1. FIG. 4 is a substantially diagrammatic elevational view and FIG. 5 is a corresponding plan view of a vehicle according to a second embodiment. FIG. 6 illustrates the trailer of this embodiment, as seen from the rear and partly in section along line X–X in FIG. 4. FIG. 7 illustrates a cross section along the line IX–IX of FIG. 4.

In both the illustrated embodiments the power vehicle as a whole is designated 1 and the trailer as a whole designated 2, and the power vehicle has one single pair of wheels 3 and the trailer in the same way one single pair of wheels 4, both said pair of wheels being located at the rear end of the power vehicle and trailer, respectively. However, the number of wheel pairs is not restricted just to totally two pairs which number just has been chosen by way of example. In the illustrated embodiment the steering is obtained in a manner not further described by pivoting the power vehicle relative to the trailer about a pivot axis indicated at 5 in the plan views. In the present embodiment, the trailer can be pivoted 90° relative to the trailer. Of the connection between the power vehicle and the trailer and the steering means belonging thereto, only the contours of a casing 6 mounted on the trailer are illustrated.

In the embodiments illustrated, the trailer has an outer frame carried by the wheels 4 and in the front connected with the power vehicle through the steering coupling 6 and an inner frame 8 which is movably mounted within the outer frame. The motion of the inner frame in the outer frame is substantially adapted to occur in a vertical direction in a way which is to be described in the following for the different embodiments. In all the embodiments both frames are U-shaped and open to the rear, i.e. at the end remote from the power vehicle.

In the embodiment illustrated in FIGS. 1—3 the trailer thus has an outer frame 7 carried by two wheels 4 adjacent the rear end and consisting of a U-shaped structure open to the rear and an inner frame enclosed by the outer frame and vertically movable therein and similarly U-shaped and open to the rear.

In this embodiment the inner frame has supporting flanges 19 extending along the whole length on the frame sides which are entirely made with L-shaped cross section. The inner frame is supported by two hydraulic cylinders 25 mounted at the rear ends of the limbs of the outer frame and one hydraulic cylinder 26 of telescopic type mounted centrally on the front cross piece of the outer frame. The telescopic cylinder 26 is adapted to ensure the parallel vertical movement of the inner frame together with the cylinders 25 and also to provide for the tipping movement alone.

The hydraulic cylinders 25 are mounted in bores in the limbs of the outer frame. The pistons 29 are at their upper end at 30 connected with brackets 31, which at their lower portion are joined with a bearing sleeve 27 for a stud 28 protruding laterally from the actual limb of the outer frame. By means of said cylinders the studs 28 can be raised or lowered relative to the outer frame, on one hand for providing the movement of the inner frame between the lowermost seizing position thereof and the transport position and on the other for forming a vertically adjustable tipping center for the inner frame. While the rear portion of the inner frame is raised or lowered by the cylinders 25, the corresponding raising and lowering movement of the front portion of the inner frame is obtained by means of a cylinder 26, for this purpose being connected to a bracket 32 on the front portion of the inner frame. The connection between the cylinder 26 and the bracket 32 is provided by a pivot pin 33. The piston of the cylinder 26 extending downwardly is pivotally connected to the front portion of the outer frame at 34.

For seizing a loaded container standing on the ground, the inner frame is lowered to its lowermost position by the hydraulic cylinders 25, 26, so that the trailer can be moved in reverse to the seizing position. By means of the cylinders 25, 26 the inner frame then is raised to the transport position, as illustrated in FIG. 1. Under the transport the inner frame and the load container carried thereby maintain hanging on the three hydraulic cylinders. When unloading, the inner frame is moved to the tipping position by the front hydraulic cylinder 26, and the inner frame is pivoted about the studs 28 acting as tipping operation center. Upon completion of the tipping the inner frame is returned first to the transport position and then, after the vehicle has been driven to the desired delivery place, the inner frame is lowered to the lowermost position, in which the engagement between the inner frame and the container is removed and the vehicle can be moved into position for seizing another container loaded in the meantime.

In the second embodiment according to FIGS. 4—7 the outer frame 7 is provided with guide rollers 40 for facilitating the vertical parallel movement of the inner frame. As in the embodiment according to FIGS. 1—3, the inner frame has flanges 19 extending along the whole length of the frame sides or limbs, and is carried by two rear hydraulic cylinders 41 and a front hydraulic cylinder 42 of telescopic type. The embodiment according to FIGS. 4—7 differs from the embodiment according to FIGS. 1—3 in that there is mounted at the rear end of the trailer a yoke member 43 common to both frames. The pillars 43a, 43b of said yoke are formed at their lower end as casings 44, of which the one belonging to the pillar 43a is illustrated in section to the left in FIG. 6. The casing is made integrally with the respective side portion or limb of the inner frame. In the bottom of the housing there is journaled a transverse stud 46 by means of a sleeve which is divided longitudinally in three portions so as to consist of an intermediate portion 45, the length and position of which corresponds to the thickness and position of the outer frame 7, and two end portions 45a, 45b, each mounted in the sidewall of the casing 44.

In a bore in the portion of the outer frame 7 lying within the casing, a hydraulic cylinder 41 is mounted. The piston 47 of this cylinder is at its upper end connected with the upper cross member 48 of a yoke 49 mounted on the inner frame in a nonillustrated manner.

When raising a loaded container after moving the trailer in reverse up to the container as in the above-mentioned embodiments while the inner frame is in its lowermost position, the three hydraulic cylinders 41, 41, 42 cooperate and the raising movement will continue until the intermediate portion 45 of the bearing sleeve around the stud 46 abuts the lower end of the outer frame and become jammed against the same. By this, the vertical position of the stud 46 is fixed and maintained by the pressure in the cylinders 41. A corresponding vertical position is maintained at the front portion of the inner frame by the cylinder 42.

In the transport position thus achieved both frames 7 and 8, respectively, are fixed mutually and relative to the yoke 43 in that the casings 44 made integrally with the pillars of the yoke are urged against the outer frame through the stud 46 and the sleeve 45. Now the transport can be carried out with the inner frame hanging on the three hydraulic cylinders.

A tipping is carried out with the aid of the telescope cylinder 42 and then the inner frame pivots about the stud 46 maintained in the level of the transport position. After the completion of the tipping, the inner frame is returned to the transport position and can then be lowered to its lowermost position for delivery of the container in a manner analogous with the embodiment according to FIGS. 1—3.

The above-described trailer can, as already stated, be used for transport of other load-carrying means than containers without deviating from the scope of invention. Instead of hydraulically operated means for raising and tipping, other fluid-operated means can be used for the same purpose.

We claim:

1. A transport vehicle for picking up, transporting and dumping a load comprising in combination:
   a tractor;
   a rearwardly opening outer U-shaped frame hingedly connected to said tractor and having a pair of longitudinally extending substantially parallel side sections and a transverse section connecting the ends of said side sections adjacent said tractor;
   a rearwardly opening inner U-shaped frame disposed within said outer frame and having a pair of longitudinally extending substantially parallel side sections and a transverse section connecting the ends of said side sections adjacent said tractor, the distance between said side sections of said inner frame being shorter than the distance between said side sections of said outer frame;
   first and second hydraulic cylinder units each operatively connected between the free end portion of one of said side sections of said outer frame and the free end portion of the corresponding side section of said inner frame; and
   a third hydraulic cylinder unit operatively connected between the center of said transverse section of said outer frame and the center of said transverse section of said inner frame, said cylinder units constituting a three-point suspension for said inner frame and being operable for moving said inner frame to and from a position in which said inner frame is in the same horizontal plane as said outer frame and is surrounded by said outer frame and for lowering, raising and tilting said inner frame from said position.

2. The combination of claim 1 wherein each of said side sections of said outer frame supports a horizontal stud, each of said first and second hydraulic cylinder units being pivotally supported on a respective one of said studs.

3. The combination of claim 1, in which a yoke common to both the outer frame and the inner frame is mounted at the rear end of said trailer, said yoke being permanently connected with said inner frame and adapted to be temporarily clamped against said outer frame.

4. The combination of claim 3 wherein said yoke is provided with carrying pillars integral with the limbs of the inner frame and formed as bearings for studs serving as pivotal supports, said studs being arranged to be clamped to said outer frame by raising said inner frame to transport position.